United States Patent
Fabiny et al.

(10) Patent No.: US 6,747,799 B2
(45) Date of Patent: Jun. 8, 2004

(54) HIGH-EFFICIENCY LOW-POLARIZATION-DEPENDENT-LOSS LAMELLAR DIFFRACTION-GRATING PROFILE AND PRODUCTION PROCESS

(75) Inventors: Larry Fabiny, Boulder, CO (US); Kenneth Edmund Arnett, Boulder, CO (US)

(73) Assignee: PTS Corporation, San Jose, CA (US)

(*) Notice: Subject to any disclaimer, the term of this patent is extended or adjusted under 35 U.S.C. 154(b) by 24 days.

(21) Appl. No.: 09/992,849

(22) Filed: Nov. 12, 2001

(65) Prior Publication Data

US 2003/0090802 A1 May 15, 2003

(51) Int. Cl.⁷ .............................. G02B 5/18; G02B 6/34; H04J 14/02
(52) U.S. Cl. ......................... 359/569; 385/37; 398/84; 398/87
(58) Field of Search ................ 359/569, 566, 359/558, 563, 572, 124, 115, 127, 130; 385/15, 31, 37; 398/79, 80, 81, 43, 82, 83, 84, 85, 87

(56) References Cited

U.S. PATENT DOCUMENTS

| | | | |
|---|---|---|---|
| 5,212,582 A | 5/1993 | Nelson | |
| 5,279,924 A | 1/1994 | Sakai et al. | |
| 5,414,540 A | 5/1995 | Patel et al. | |
| 5,796,479 A | * 8/1998 | Derickson et al. | 356/326 |
| 5,828,492 A | * 10/1998 | Moser et al. | 359/575 |
| 5,917,625 A | 6/1999 | Ogusu et al. | |
| 5,960,133 A | 9/1999 | Tomlinson | |
| 5,999,672 A | 12/1999 | Hunter et al. | |
| 6,097,519 A | 8/2000 | Ford et al. | |
| 6,097,859 A | 8/2000 | Solgaard et al. | |
| 6,097,863 A | 8/2000 | Chowdhury | |
| 6,108,471 A | 8/2000 | Zhang et al. | |
| 6,191,890 B1 | * 2/2001 | Baets et al. | 359/572 |
| 6,234,634 B1 | * 5/2001 | Hansen et al. | 353/20 |
| 2002/0024735 A1 | * 2/2002 | Kleemann et al. | 359/572 |
| 2002/0186926 A1 | * 12/2002 | Hoose et al. | 385/37 |
| 2003/0067687 A1 | * 4/2003 | Barton et al. | 359/569 |

OTHER PUBLICATIONS

U.S. patent application Ser. No. 09/442,061, Weverka et al., filed Nov. 16, 1999.

U.S. patent application Ser. No. 09/615,300, Fabiny et al., filed Jul. 13, 2000.

Ford, Joseph E., et al., "Wavelength Add–Drop Switching Using Tilting Micromirrors," Journal of Lightwave Technology, vol. 17, No. 5, May 1999.

Grade, John D., et al., "A Large–Deflection Electrostatic Actuator for Optical Switching Applications, " Solid–State Sensor and Actuator Workshop, Hilton Head Island, South Carolina, Jun. 4–8, 2000.

Graf, U.U., et al., "Fabrication and evaluation of an etched infrared diffraction grating," Applied Optics, vol. 33, No. 1, Jan. 1994.

(List continued on next page.)

*Primary Examiner*—Thong Nguyen
*Assistant Examiner*—Arnel C. Lavarias
(74) *Attorney, Agent, or Firm*—Townsend and Townsend and Crew LLP

(57) ABSTRACT

A reflective lamellar diffraction grating is provided that is suitable for a variety of applications, including applications related to C-band telecommunication functions. The average efficiency of the diffraction grating in S- and P-polarization states exceeds 90% while simultaneously providing a PDL less than 0.2 dB over the entire wavelength range used for C-band telecommunication functions. The diffraction grating is thus suitable for incorporation into various telecommunication systems, including a wavelength router configured for routing signals having a plurality of spectral bands.

12 Claims, 9 Drawing Sheets

OTHER PUBLICATIONS

Keller, Luke D., et al., "Fabrication and testing of chemically micromachined silicon echelle gratings," Applied Optics, vol. 39, No. 7, Mar. 2000.

Nishi, I., et al., "Broad–Passband–Width Optical Filter for Multi/Demultiplexer Using a Diffraction Grating and a Retroreflector Prism," Electronics Letters, vol. 21, No. 10, May 9, 1985.

Philippe, P., et al., "Wavelength demultiplexer: using echelette gratings on silicon substrate," Applied Optics, vol. 24, No. 7, Apr. 1, 1985.

Rallison, R.D., et al., "Dense Wavelength Division Multiplexing (DWDM) and the Dickson Grating," White Paper, Jan. 6, 2001.

Shams, Mohammad Kazem, et al., "Preferential chemical etching of blazed gratings in (110)–oriented GaAs," Optics Letters, vol. 4, No. 3, Mar. 1979.

Smith, M.S.D., et al., "Diffraction ratings Utilizing Total Internal Reflection Facets in Littrow Configuration," IEEE Photinics Technology Letters, vol. 11, No. 1, Jan. 1999.

Sun, Z..J., et al., "Demultiplexer with 120 Channels and 0.29–nm Channel Spacing," IEEE Photonics Technology Letters, vol. 10, No. 1, Jan. 1998.

Loewen, Erwin G., et al., "Diffraction Gratings and Applications," Marcel Dekker, Inc, 1997, pp. 132–136, 300–301.

* cited by examiner

HIGH-EFFICIENCY LOW-POLARIZATION-DEPENDENT-LOSS LAMELLAR DIFFRACTION-GRATING PROFILE AND PRODUCTION PROCESS

BACKGROUND OF THE INVENTION

This application relates generally to a method and apparatus for diffracting light, and more specifically to a diffraction grating useful in various applications, such as optical telecommunications, that require high diffraction efficiency in multiple polarization orientations.

The Internet and data communications are causing an explosion in the global demand for bandwidth. Fiber optic telecommunications systems are currently deploying a relatively new technology called dense wavelength division multiplexing (DWDM) to expand the capacity of new and existing optical fiber systems to help satisfy this demand. In DWDM, multiple wavelengths of light simultaneously transport information through a single optical fiber. Each wavelength operates as an individual channel carrying a stream of data. The carrying capacity of a fiber is multiplied by the number of DWDM channels used. Today, DWDM systems using up to 80 channels are available from multiple manufacturers, with more promised in the future. Such systems are typically configured for operation in the telecommunications C band, which includes wavelengths between 1530 and 1565 nm.

Optical wavelength routing functions often use demultiplexing of a light stream into its many individual wavelengths, which are then optically directed along different paths. Subsequently, different wavelength signals may then be multiplexed into a common pathway. Within such routing devices, the optical signals are routed between the common and individual optical pathways by a combination of dispersion and focusing mechanisms. The focusing mechanism forms discrete images of the common pathway in each wavelength of the different optical signals and the dispersion mechanism relatively displaces the images along a focal line by amounts that vary with the signal wavelength.

Both phased arrays and reflective diffraction gratings may be used to perform the dispersing functions. While phased arrays are adequate when the number of channels carrying different wavelength signals is small, reflective diffraction gratings are generally preferable when large numbers of channels are used. However, reflective diffraction gratings tend to exhibit greater polarization sensitivity and since the polarization of optical signals often fluctuates in optical communication systems, this sensitivity may result in large variations in transmission efficiency. Loss of information is possible unless compensating amplification of the signals is used to maintain adequate signal-to-noise ratios. Although polarization sensitivity may generally be mitigated by increasing the grating pitch of the reflective grating, limitations on the desired wavelength dispersion for signals at optical telecommunication wavelengths preclude an increase in grating pitch sufficient to achieve high diffraction efficiency in all polarization directions.

It is therefore desirable to provide a diffraction grating that can achieve high diffraction efficiency without significant polarization sensitivity when used at C-band optical telecommunication wavelengths.

BRIEF SUMMARY OF THE INVENTION

Thus, embodiments of the invention provide a reflective lamellar diffraction grating suitable for a variety of applications, including applications related to C-band telecommunication functions. In certain embodiments, the average efficiency of the diffraction grating in S- and P-polarization states exceeds 90% while simultaneously providing a PDL less than 0.2 dB over the entire wavelength range used for C-band telecommunication functions. The diffraction grating is thus suitable for incorporation into various telecommunication systems, including a wavelength router configured for routing signals having a plurality of spectral bands.

Accordingly, in a first set of embodiments, the lamellar diffraction grating comprises a substrate and an arrangement of generally rectangular protrusions spaced along a surface of the substrate at an average grating period a. The protrusions have an average height h and an average width w which are defined so that h/a>0.5 and w/a<0.5. The diffraction grating thus has a profile in which the protrusions are generally both narrow and deep. In one embodiment, the protrusions have substantially equal heights and have substantially equal widths. The width of each protrusion may be defined by a FWHM measurement of a profile of such protrusion. For telecommunications applications, the grating period corresponds to a line density 1/a between 700 and 1100 protrusions/mm, and may correspond to a line density between 800 and 1000 protrusions/mm. Certain embodiments correspond to average heights and widths that provide particular efficiency and PDL behaviors: in one embodiment h/a is between 0.7 and 1.1, and w/a is between 0.15 and 0.3; in another embodiment h/a is between 0.75 and 1.0, and w/a is between 0.2 and 0.3; in a further embodiment h/a is between 0.84 and 0.96, and w/a is between 0.22 and 0.3.

As a result of the narrow and deep character of the protrusions, they may be fragile. Accordingly, further embodiments provide a method for fabricating such a grating and account for the fragility of the protrusions. A pattern for an anisotropic hard etch mask is formed over a surface of a substrate. The pattern has a period corresponding to the average grating period a of the diffraction grating to be produced. It also defines a width corresponding to the average protrusion width w of the diffraction grating. A plurality of gaps are etched into the substrate through the patterned anisotropic hard etch mask to an average depth that corresponds to the average protrusion height h of the diffraction grating. Such etching may be performed by using an anisotropic chemical etching technique. The pattern for the anisotropic hard etch mask may be formed by depositing the etch-mask material over the substrate and forming a layer of photoresist over the etch-mask material. The pattern is exposed onto the layer of photoresist and the anisotropic hard etch mask is etched through the pattern in the layer of photoresist, such as with an isotropic reactive ion etching technique. The layer of photoresist is subsequently removed, such as by application of an organic solvent.

In specific embodiments, such reflective lamellar diffraction gratings may be used in wavelength routers. One such embodiment includes a free-space optical train disposed between an input port and a plurality of output ports and provides optical paths for routing light having a plurality of spectral bands. The optical train includes a reflective lamellar diffraction grating with the characteristics described above and is disposed to intercept light traveling from the input port.

BRIEF DESCRIPTION OF THE DRAWINGS

A further understanding of the nature and advantages of the present invention may be realized by reference to the remaining portions of the specification and the drawings wherein like reference labels are used throughout the several drawings to refer to similar components. In some instances, a sublabel is included in parentheses following a reference label. In such cases, reference only to the reference label is intended to refer to all similar components, including those identified separately by sublabels.

DETAILED DESCRIPTION OF THE INVENTION

1. Introduction

As part of development of a wavelength router to be used in optical networking systems, the inventors were confronted with the need to provide a dispersive element for demultiplexing a light stream into its individual wavelength component signals. Considerations made in assessing the usefulness of a particular design for a dispersive element include the efficiency of the dispersive element in different polarization configurations and the polarization-dependent loss ("PDL"). Such considerations are relevant because efficiency losses and polarization-dependent losses are cumulative, increasing with each encounter with the dispersive element. A variety of possible designs were considered, including designs for reflective diffraction gratings, taking these considerations into account. Despite teachings in the art against the use of deep, narrow lamellar reflective gratings, the inventors have discovered that such a profile may provide the desired efficiencies and PDLs, and have developed a method for producing such a grating profile.

Figure 1A:
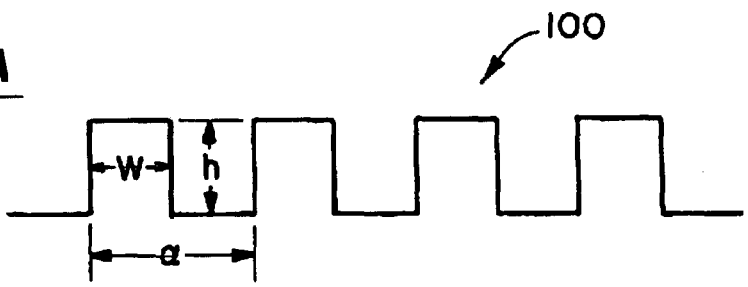
FIGS. 1A–1E provide schematic illustrations of various lamellar grating profile.
Figure 1B:
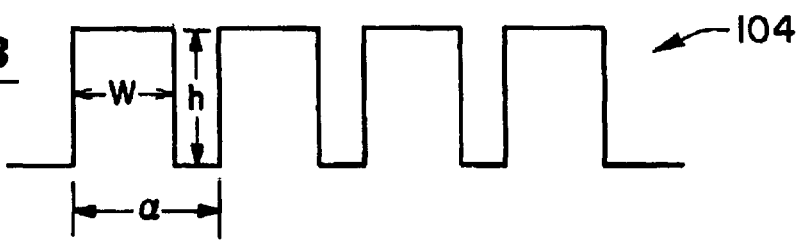
Figure 1C:
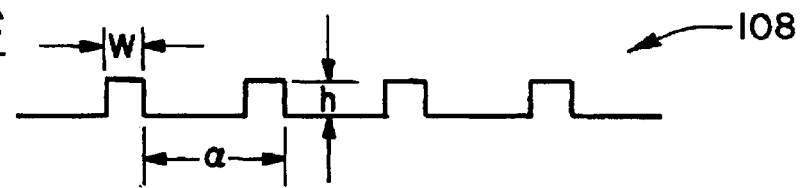
Figure 1D:
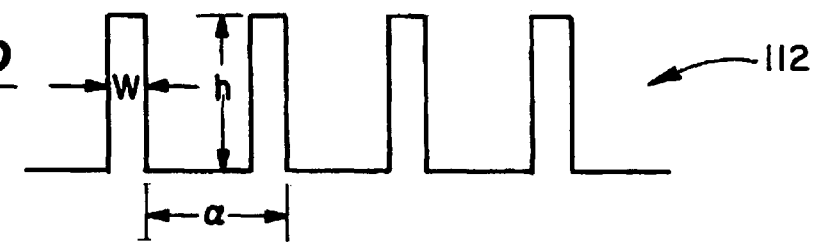
Figure 1E:
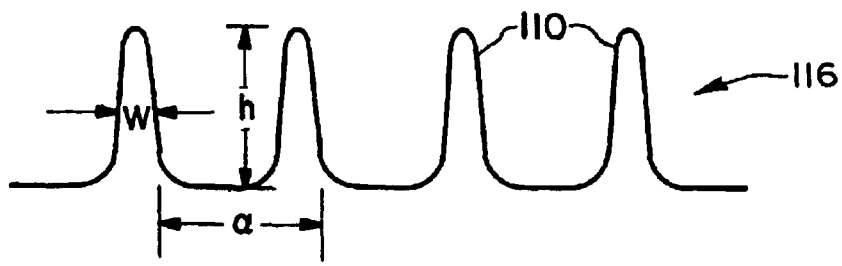

FIGS. 1A–1E provide examples of a lamellar grating profile, which comprises a generally rectangular profile. Such lamellar grating profiles may be characterized by the grating period a, and the height h and width w of the rectangular protrusions. FIG. 1A provides an example of a regular lamellar profile 100 in which w=h=a/2. FIG. 1B provides an example of a "deep" (but not narrow) lamellar profile 104 in which h/a>0.5. FIG. 1C provides an example of a "narrow" (but not deep) lamellar profile 108 in which w/a<0.5. FIG. 1D provides an example of a deep, narrow lamellar profile 112 in which h/a>0.5 and w/a<0.5. Manufacturing processes may result in the rectangularity of the profile being imperfect. Accordingly, as used herein, "generally rectangular" is intended to include profiles 116 such as shown in FIG. 1E, in which the protrusions 118 may be somewhat wider at their bottoms and somewhat narrower at their tops, provided that the height and width of the profiles may still be defined. In one embodiment, the width w of the protrusion 118 is defined as the width when measured at a point at half its height ("FWHM").

In *Diffraction Gratings and Applications*, Erwin G. Loewen and Evgeny (Marcel Dekker, New York, 1997) ("Loewen"), a standard reference work that discusses diffraction-grating design, it is taught that deep gratings are undesirable because of problems in controlling the profiles and the fact that replicator processes are difficult to adapt to such gratings (Loewen, p. 132). Beyond such cautionary teachings away from deep gratings because of the manufacturing difficulties, Loewen further teaches that while high efficiency can be achieved for transmissive gratings under Bragg conditions, reflection grating are instead preferably manufactured with only moderate depths (id., p. 132). Loewen specifically teaches that to have high efficiency with a reflective grating, the depth should be approximately h/a≦0.35 (id., p. 134). Even under such conditions, Loewen further teaches that the response in S and P polarization states (referred to therein respectively as TM and TE polarization states in Loewen) is asymmetrical (id., p. 134).

Notwithstanding these teachings, the inventors have developed a lamellar reflective diffraction-grating profile simultaneously having high efficiency in both S and P polarization states. Moreover, the profile simultaneously has an unexpectedly low PDL under certain geometrical conditions.

2. Diffraction of Optical Signals

Figure 2:
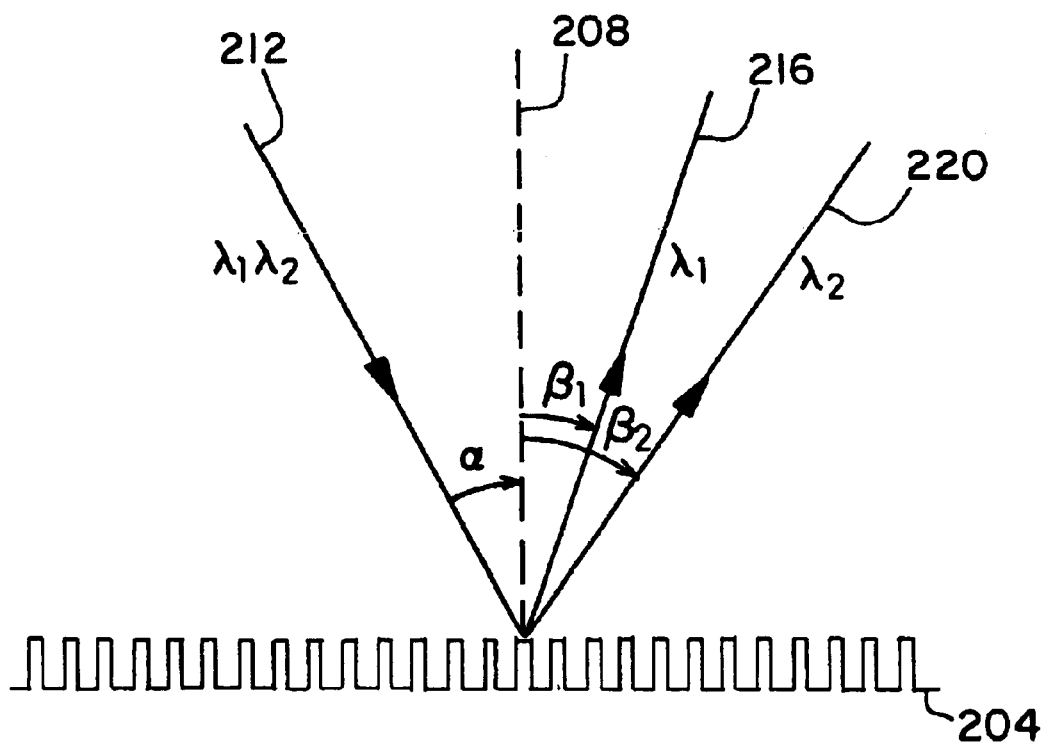
FIG. 2 provides a schematic illustration of the diffractive behavior of a lamellar diffraction grating.

FIG. 2 provides a schematic illustration of how a reflective diffraction grating 204 according to one embodiment of the invention may be used for demultiplexing an optical signal 212 that comprises a plurality of spectral bands that make up the signal components. For simplicity, the optical signal 212 is shown as comprising monochromatic signal components at wavelengths $\lambda_1$ and $\lambda_2$, although it will be understood that it may comprise a larger number of monochromatic signal components. When illuminated at an angle α from its normal, the reflective diffraction grating 204 directs light with wavelength λ towards angle β, also with respect to the normal 208, in accordance with the grating equation, $$m\lambda = a(\sin\alpha \pm \sin\beta),$$

where m is an integral order of interference and a is the grating period. Signals 216 and 220 corresponding to the independent wavelengths are reflected respectively at different angles $\beta_1$ and $\beta_2$ from the grating 204 so that the signal 212 is effectively demultiplexed.

For such a reflective grating 204, high efficiency is generally achieved when used in first order near the Littrow condition, in which incident and diffracted rays are autocollimated so that α=β≡φ. Under these circumstances, the diffraction equation takes the simple form $$\sin\varphi = \frac{\lambda}{2a}.$$

In one embodiment in which the system is configured for near-Littrow behavior, the grating 204 is oriented for high dispersion so that the multiplexed signal is incident at an angle of approximately α=45° with respect to the normal 208. In such an embodiment, the line density 1/a of the grating is given by $$\frac{1}{a} = \frac{\sqrt{2}}{\lambda},$$

so that at λ≈1550 nm, the line density of the grating 204 is of the order of 900 lines/mm. Generally, with operational wavelengths in the C-band range of 1530–1565 nm, a line density between about 700 and 1100 lines/mm is thus desirable. Current efforts may extend the operational wavelength range for optical telecommunications by about 30 nm on either end of the 1530–1565 nm range.

3. Diffraction Efficiency for Specific Embodiments

Embodiments of the invention thus include a lamellar reflective diffraction grating for diffracting an optical signal. Examples of the general shape of such embodiments are provided by FIGS. 1D and 1E. The diffraction grating includes a substrate and an arrangement of generally rectangular protrusions spaced along a surface of the substrate at an average grating period a. The protrusions have an average height h and an average width w such that h/a>0.5 and w/a<0.5. In some embodiments, the protrusions have substantially the same height and have substantially the same width so that the diffraction grating is regular, although this is not required. For optical signals comprising wavelengths in the range of 1530–1565 nm, such as used for C-band telecommunications applications, the grating period corresponds to a line density 1/a between 700 and 1100 protrusions/mm ("protrusions/mm" sometimes being referred to equivalently herein as "lines/mm").

A number of numerical simulations have been performed by the inventors to characterize the efficiency and PDL of a diffraction grating made according to embodiments of the invention under different circumstances. Results of such calculations are presented generally in FIGS. 3A–3C. As evident from such figures, embodiments of the invention may simultaneously provide an efficiency over the entire range of C-band telecommunications wavelengths greater than 94% in both S and P polarizations, while also maintaining a PDL less than 0.04 dB. The diffraction efficiency of a diffraction grating is defined as the ratio of the energy of the diffracted wave to the energy of the incident wave: $E=E_{out}/E_{in}$.

Figure 3A:
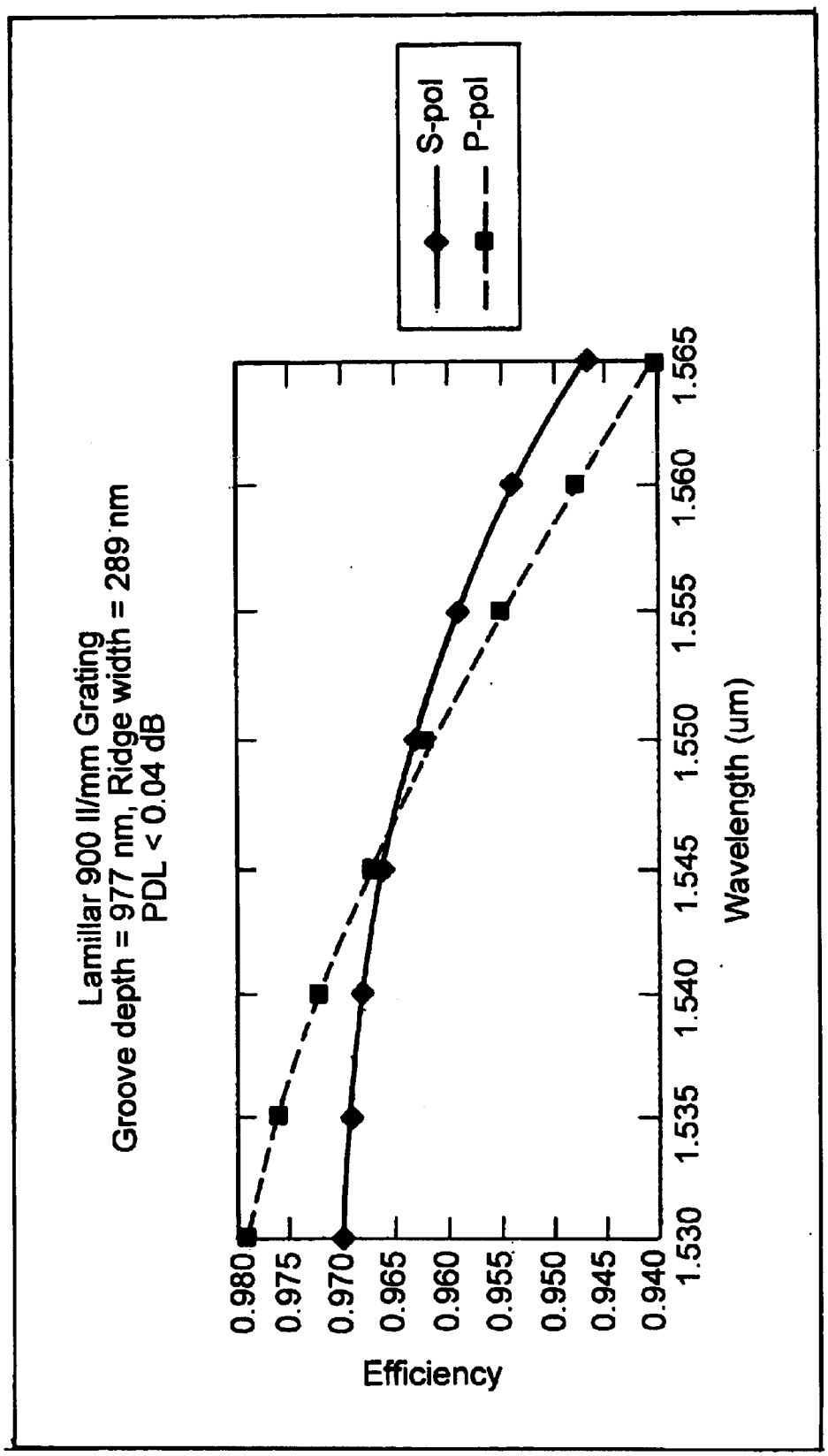
FIG. 3A is a graph showing the S- and P-polarization efficiencies for a lamellar diffraction grating made according to embodiments of the invention.

FIG. 3A shows the results of numerical calculations for the S and P polarization efficiencies of a regular grating in which 1/a=900 lines/mm, h=977 nm, and w=289 nm. The numerical calculations were performed with the commercially available software PC-Grate. The abscissa provides wavelengths for monochromatic signals diffracted by the grating over a range from 1530 to 1565 nm, and the ordinate shows the resulting efficiencies. The solid line corresponds to the S-polarization efficiency and the dashed line corresponds to the P-polarization efficiency. While both efficiencies show a general trend to decrease as the wavelength increases over the wavelength range, both are maintained at a high level for the entire range. The S-polarization efficiency tends to be greater than the P-polarization efficiency at larger wavelengths while the reverse behavior is seen at smaller wavelengths. The PDL is less that 0.04 over the entire wavelength range.

Figure 3B:
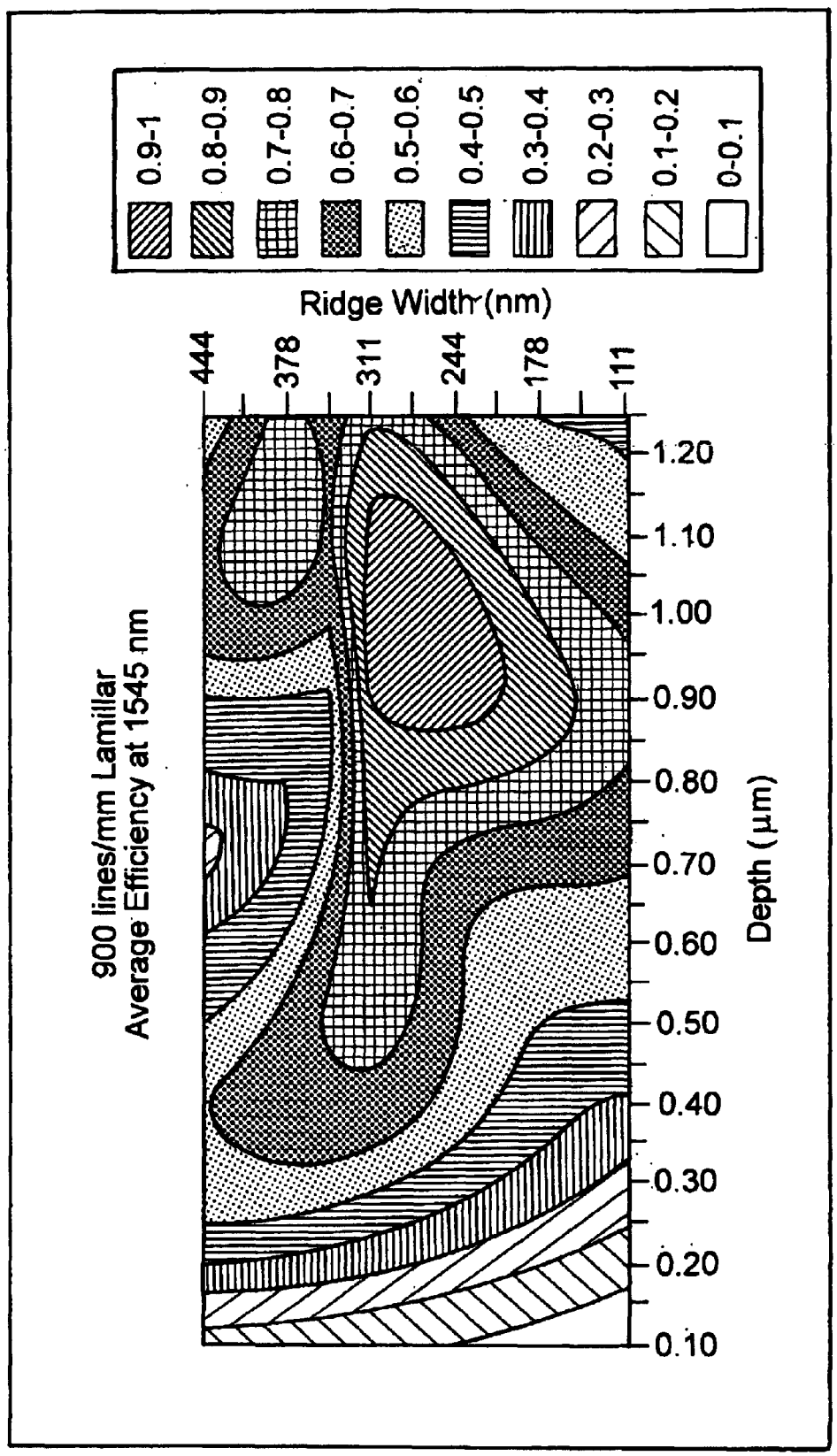
FIG. 3B is a contour graph showing the average polarization efficiency of a lamellar diffraction grating made according to embodiments of the invention as the characteristics of protrusions comprised by the grating are varied.

While the parameters used in FIG. 3A show the best behavior found numerically by the inventors at 1/a=900 lines/mm, similarly high efficiency may be achieved even with some variation in the height and width of the protrusions. This is illustrated in FIG. 3B, in which a contour plot is provided from calculations using the commercially available PC-Grate software to show the behavior of the average of the S- and P-polarization efficiencies as a function of both h and w. The calculations were performed for a monochromatic optical signal having a wavelength λ=1545 nm, approximately midway within the C-band telecommunications range. The average efficiency is defined as $\epsilon_{av}=(\epsilon_P+\epsilon_S)/2$. The calculations were again performed for a regular grating in which 1/a=900 lines/mm. The abscissa shows results for h between 0.10 and 1.25 μm (corresponding to h/a between 0.09 and 1.125) and for w between 111 and 444 nm (corresponding to w/a between 0.1 and 0.4). The plot shows contours for the average efficiency $\epsilon_{av}$ at 0.1 intervals. It is evident that certain regions provide very high average efficiency. For example, the average efficiency exceeds 80% approximately in the region where 0.7<h/a<1.1 and 0.15<w/a<0.3. The average efficiency exceeds 90% approximately in the region where 0.75<h/a<1.0 and 0.2<w/a<0.3.

Figure 3C:
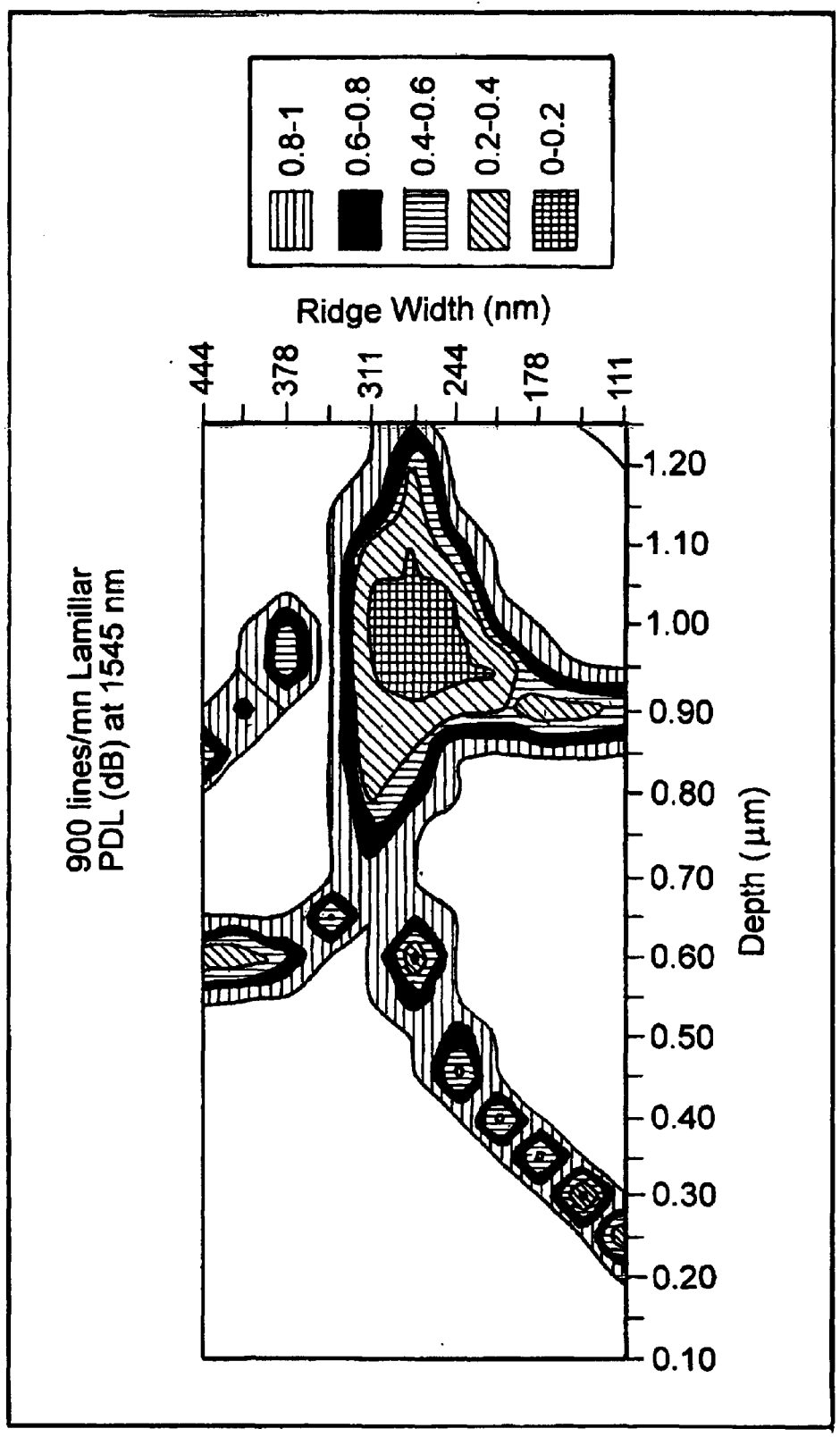
FIG. 3C is a contour graph showing the polarization-dependent loss of a lamellar diffraction grating made according to embodiments of the invention as the characteristics of protrusions comprised by the grating are varied.

FIG. 3C permits a comparison of the average efficiency achieved under certain conditions with the PDL by providing a contour plot of the PDL at contour intervals of 0.2 dB over the same abscissa and ordinate range provided in FIG. 3B. FIG. 3C is also derived from numerical calculations using the commercial PC-Grate software for a regular grating having 1/a=900 lines/mm and for an optical signal at λ=1545 nm. It is evident that in the same ranges discussed above that the PDL is small, generally less than 1.0 dB, and rapidly decreases to even smaller values so that the PDL is less than 0.2 dB approximately in the region where 0.84<h/a<0.96 and 0.22<w/a<0.3. Fortuitously, this region of very low PDL overlaps entirely the region in which the average efficiency exceeds 90%. Accordingly, embodiments of the invention unexpectedly permit the use of a lamellar reflective diffraction grating to achieve simultaneously an average efficiency that exceeds 90% and a PDL less than 0.2 dB.

4. Lamellar Grating Fabrication Process

It will be appreciated that the parameters specified by the results shown in FIGS. 3A–3C correspond to a lamellar grating in which generally rectangular protrusions are both deep and narrow. The fabrication of such structures is complicated by the fact that deep, narrow features, particularly where the width of the features is less than 1 μm, makes the protrusions generally fragile. Notably, for the embodiment corresponding to the results shown in FIG. 3A, the aspect ratio for the protrusions is h:w=3.4:1; for other embodiments in the general region where the PDL is less than 0.2 dB the aspect ratio may be almost as large as h:w≈5:1. Certain traditional fabrication methods for diffraction gratings are generally unsuitable for the production of such fragile structures having these characteristics. Accordingly, a process is also provided in accordance with embodiments of the invention for fabrication of diffraction gratings having generally rectangular protrusions of such dimensions. Such a process is illustrated generally in FIGS. 4A–4F. The illustrated process is one example of a process that may be used to fabricate reflective lamellar diffraction gratings as described above; alternative fabrication techniques may also occur to those of skill in the art after reading this description.

Figure 4A:
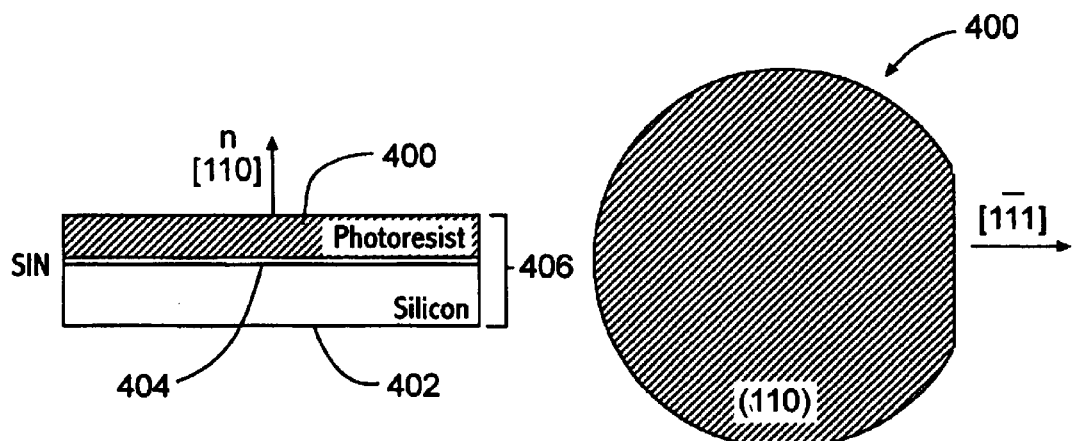
FIGS. 4A–4F provide schematic illustrations of a method used to fabricate a lamellar diffraction grating according to the invention.

The process uses certain semiconductor-processing techniques and exploits the crystallographic characteristics of the substrate, which is shown in the figures as silicon. Each of FIGS. 4A–4E, which detail the general steps used to form a diffraction grating in accordance with embodiments of the invention, shows a cross-sectional view in the left panel and a top view in the right panel. In FIG. 4A, the process begins with a surface of a substrate 402, such as a silicon substrate in which the [110] axis is oriented normal to the substrate plane, where the notation [jkl] is used to denote the usual Miller indices. The initial structure 400 shown in FIG. 4A is formed by depositing a first layer 404 to act as an anisotropic hard etch mask on the substrate 402. A suitable material for the first layer 404 includes silicon nitride. Subsequently, a photoresist layer 406 is formed on the first layer 404 by spinning and baking.

Figure 4B:
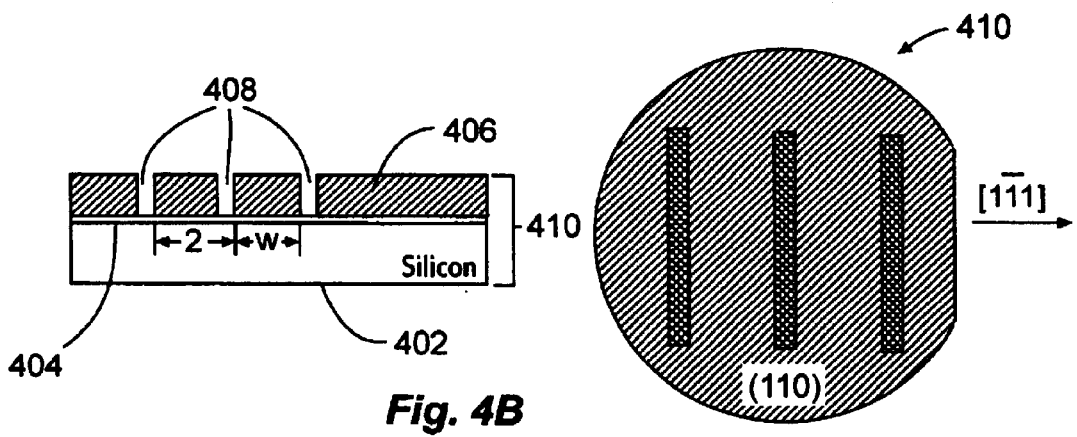
Figure 4C:
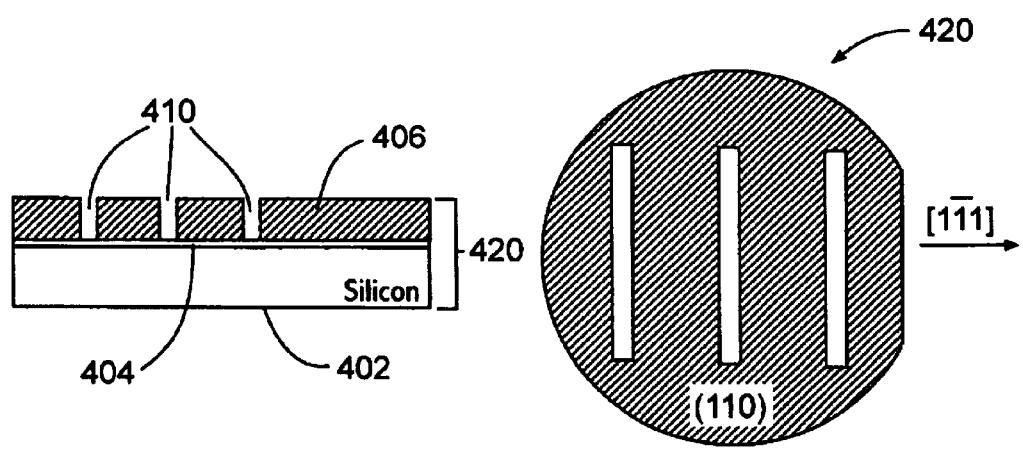
Figure 4D:
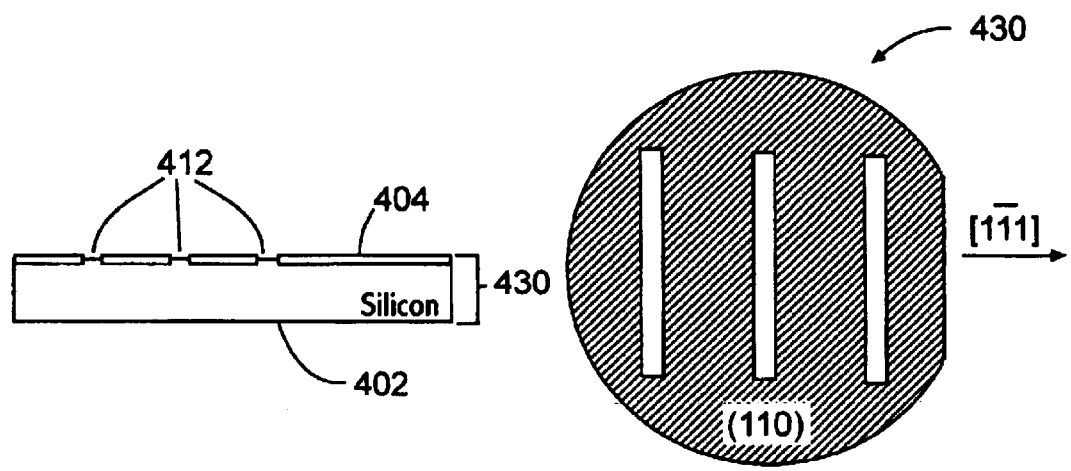

The photoresist layer 406 is patterned and exposed to form the structure 410 shown in FIG. 4B. The patterning is provided so that the resulting gaps 408 in the photoresist have an average period a and are separated by an average width w. The illustrations are intended to be schematic only and therefore do not show to scale size and shape of the gaps 408 to scale. Subsequently, the first layer 404 is etched to form gaps 410 by using a suitable anisotropic etching technique, such as an $SF_4+O_2$ reactive ion etch ("RIE"). Application of the anisotropic etching technique results in structure 420 shown in FIG. 4C. The remainder of the photoresist layer 406 is then removed to leave the patterned first layer 404 on the substrate 402. Removal of the remainder of the photoresist layer 406 may be accomplished with an organic solvent such as acetone. The resulting structure 430 having a patterned first layer 404 with gaps 412 overlying a substrate is shown in FIG. 4D.

Figure 4E:
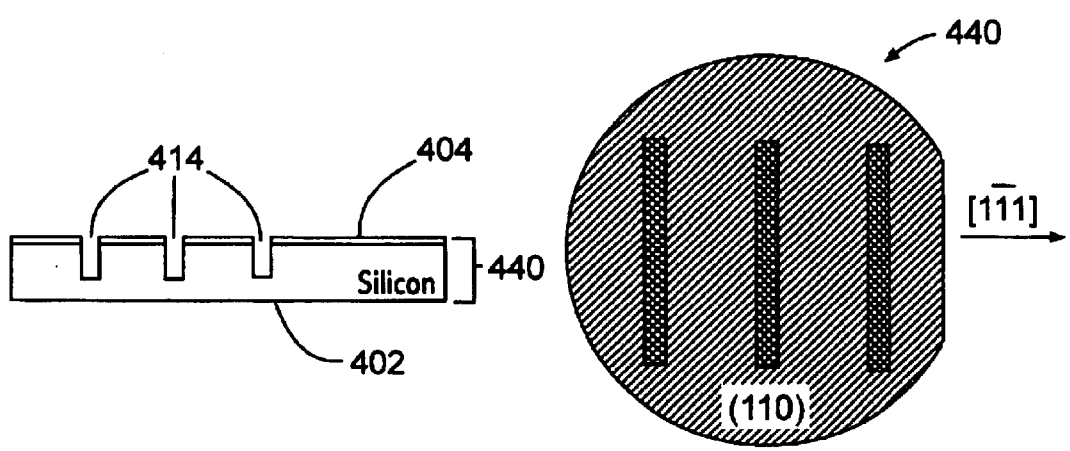
Figure 4F:
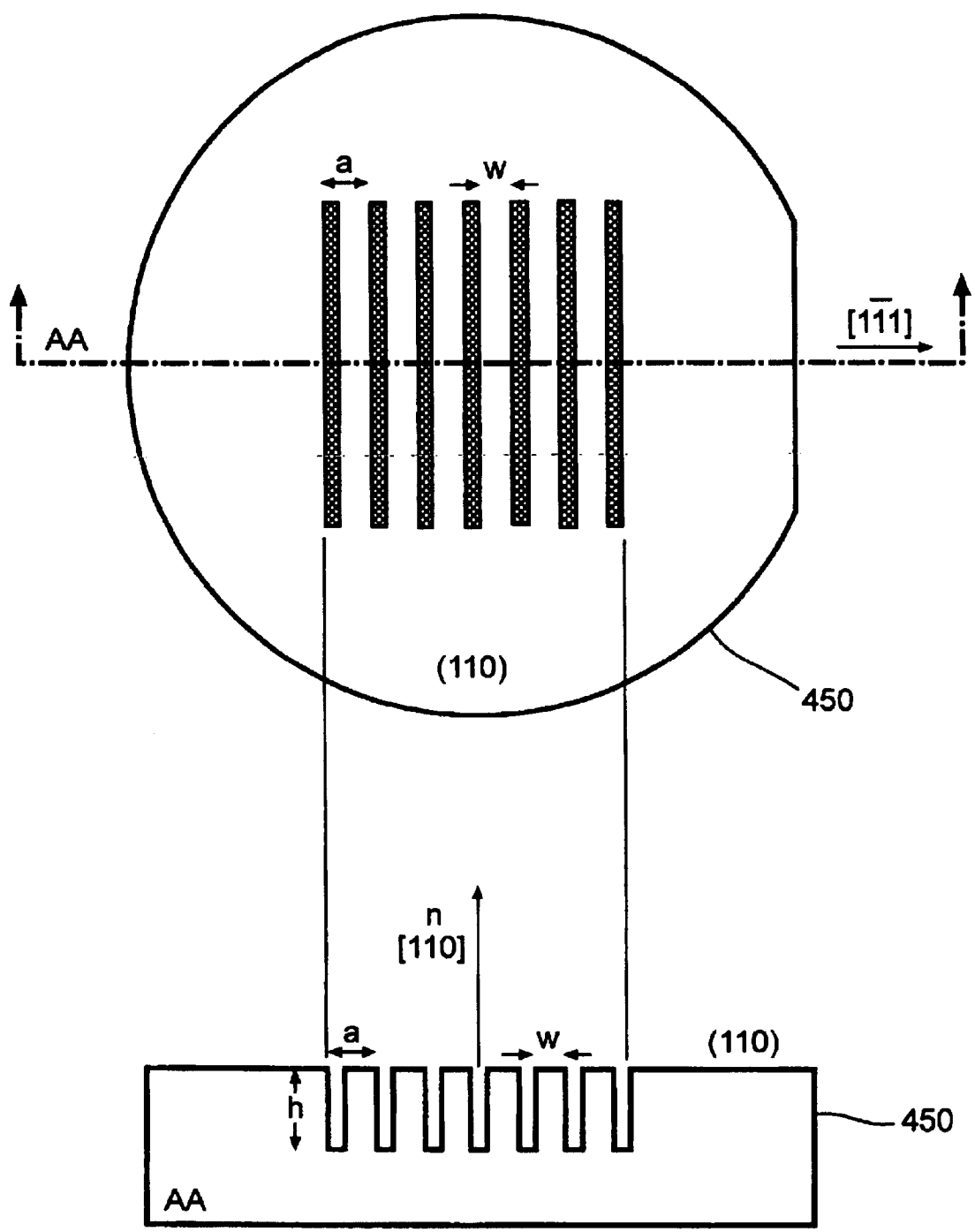

The gaps 412 in the first layer 404 are extended to form gaps 414 in the substrate 402 by applying a vertical anisotropic etching technique. The substrate gaps thus 414 have substantially the same period and width of the photoresist gaps and the resulting structure 440 is shown in FIG. 4E. The depth h of the gaps is determined by the etching time. Finally, the first layer 404 is removed, resulting in a structure 450 shown in FIG. 4F. The structure 450 may be cut from the substrate 402 and metallized to form a lamellar reflective diffraction grating in accordance with embodiments of the invention. Alternatively, the structure 450 may be used as a master from which such lamellar diffraction gratings are subsequently manufactured.

5. Wavelength Router

A reflective lamellar diffraction grating made according to embodiments of the invention, as described above, may be used in a wide variety of optical assemblies. An example of one such assembly is a wavelength router, such as the one described in detail in the copending, commonly assigned United States Patent Application, filed Nov. 16, 1999 and assigned Ser. No. 09/442,061, now U.S. Pat. No. 6,501,877, entitled "Wavelength Router," which is herein incorporated by reference in its entirety, including the Appendix, for all purposes. The following describes the structure of some embodiments of such a wavelength router, although the invention may be readily used with other wavelength-router embodiments also.

In telecommunication networks, including optical telecommunication networks, there is the need to connect individual channels (or circuits) to individual destination points, such as an end customer or to another network. Systems that perform these functions are called cross-connects. Additionally, there is the need to add or drop particular channels at an intermediate point. Systems that perform these functions are called add-drop multiplexers (ADMs). All of these networking functions are performed with a wavelength router used with the current invention by an all-optical network. Optical networks designed to operate at the wavelength level are commonly called "wavelength routing networks" or "optical transport networks" (OTN). In a wavelength routing network, the individual wavelengths in a DWDM fiber must be manageable. New types of photonic network elements operating at the wavelength level are required to perform the cross-connect, ADM and other network switching functions. Two of the primary functions are optical add-drop multiplexers (OADM) and wavelength-selective cross-connects (WSXC).

Wavelength routing functions may be performed optically with a free-space optical train disposed between the input ports and the output ports, and a routing mechanism. The free-space optical train can include air-spaced elements or can be of generally monolithic construction. The optical train includes the reflective lamellar diffraction grating, and is disposed to intercept light traveling from the input port. In the particular embodiment shown in FIGS. 5A–5C, the wavelength router is configured so that the light from the input port encounters the grating twice before reaching any of the output ports. The routing mechanism includes one or more routing elements and cooperates with the other elements in the optical train to provide optical paths that couple desired subsets of the spectral bands to desired output ports. The routing elements are disposed to intercept the different spectral bands after they have been spatially separated by their first encounter with the reflective lamellar grating.

Figure 5A:
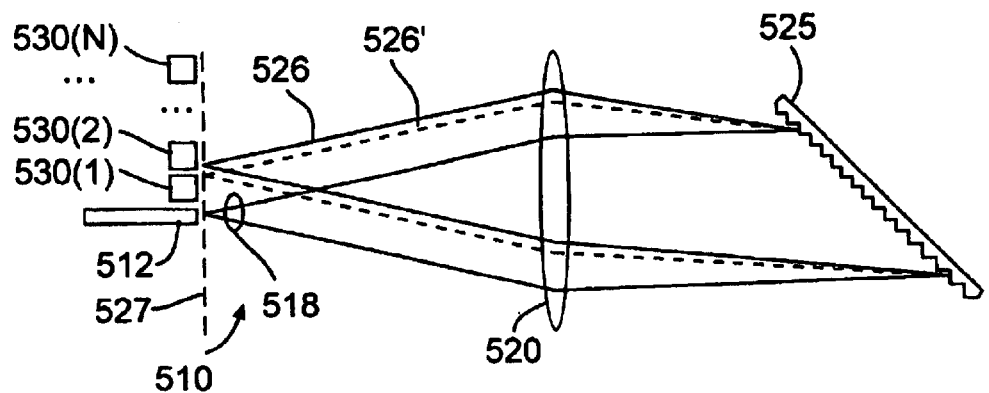
FIGS. 5A–5C provide top, side, and end views of a wavelength router that uses a reflective lamellar diffraction grating according to the invention.
Figure 5B:
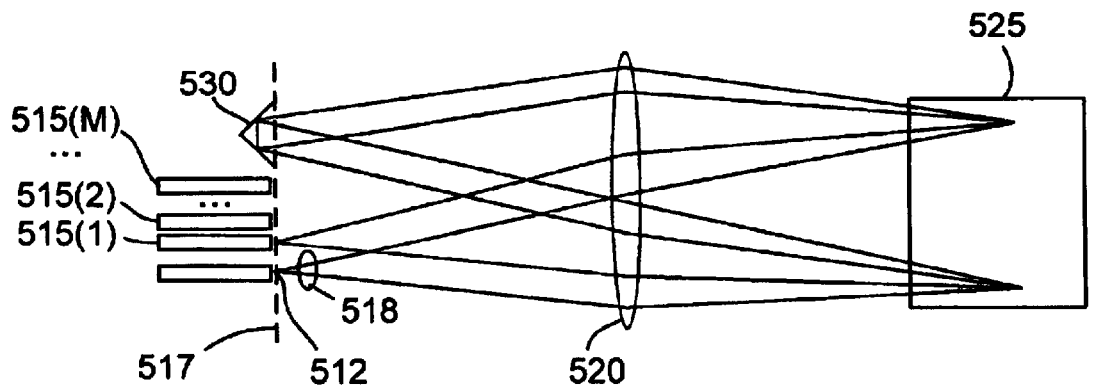
Figure 5C:
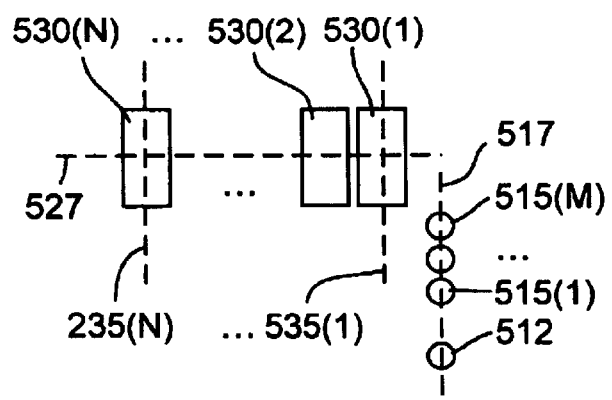

FIGS. 5A, 5B, and 5C are schematic top, side, and end views, respectively, of one such embodiment of a wavelength router 510. Its general functionality is to accept light having a plurality N of spectral bands at an input port 512, and to direct subsets of the spectral bands to desired ones of a plurality M of output ports, designated 515(1)... 515(M). The output ports are shown in the end view of FIG. 5C as disposed along a line 517 that extends generally perpendicular to the top view of FIG. 5A. Light entering the wavelength router 510 from input port 512 forms a diverging beam 518, which includes the different spectral bands. Beam 518 encounters a lens 520 that collimates the light and directs it to a lamellar reflective diffraction grating 525 made in accordance with embodiments of the invention. The grating 525 disperses the light so that collimated beams at different wavelengths are directed at different angles back towards the lens 520, and as a result of the parameters defined by embodiments of the invention does so with high efficiency and low PDL.

Two beams are shown explicitly and denoted 526 and 526', the latter drawn in dashed lines. Since these collimated beams encounter the lens 520 at different angles, they are focused towards different points along a line 527 in a transverse plane extending in the plane of the top view of FIG. 5A. The focused beams encounter respective ones of a plurality of retroreflectors, designated 530(1)... 530(N), located near the transverse plane. The beams are directed back, as diverging beams, to the lens 520 where they are collimated, and directed again to the grating 525. On the second encounter with the grating 525, the angular separation between the different beams is removed and they are directed back to the lens 520, which focuses them. The retroreflectors 530 may be configured to send their intercepted beams along a reverse path displaced along respective lines 535(1)... 535(N) that extend generally parallel to line 517 in the plane of the side view of FIG. 5B and the end view of FIG. 5C, thereby directing each beam to one or another of output ports 515.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A lamellar diffraction grating for C-band optical-telecommunication use, the lamellar diffraction grating comprising:

a substrate; and an arrangement of generally rectangular protrusions spaced along the substrate at an average grating period a that corresponds to a line density 1/a between 700 and 1100 $mm^{-1}$, wherein an average height h and an average width w of the protrusions is such that h/a is between 0.84 and 0.96 and w/a is between 0.22 and 0.3.

2. The lamellar diffraction grating recited in claim 1 wherein the generally rectangular protrusions have substantially equal heights and have substantially equal widths.

3. The lamellar diffraction grating recited in claim 1 wherein the grating period corresponds to a line density 1/a between 800 and 1000 protrusions/mm.

4. The lamellar diffraction grating recited in claim 1 wherein the width of each protrusion is defined by a FWHM measurement of a profile of such protrusion.

5. A method for diffracting an optical signal having C-band optical-telecommunication wavelengths, the method comprising:

propagating the optical signal towards an arrangement of generally rectangular protrusions spaced along a substrate at an average grating period a that corresponds to a line density 1/a between 700 and 1100 $mm^{-1}$, wherein an average height h and an average width w of the protrusions is such that h/a is between 0.84 and 0.96 and w/a is between 0.22 and 0.3; and reflecting the optical signal from the arrangement.

6. The method recited in claim 5 wherein each of the generally rectangular protrusions has a substantially equal height and width.

7. The method recited in claim 5 wherein the grating period corresponds to a line density 1/a between 800 and 1000 protrusions/mm.

8. The method recited in claim 5 wherein the width of each protrusion is defined by a FWHM measurement of a profile of such protrusion.

9. A lamellar diffraction grating for C-band optical-telecommunication use, the lamellar diffracting grating comprising:

substrate means; and means for reflecting an optical signal, such means for reflecting the optical signal including an arrangement of generally rectangular protrusion means spaced along the substrate means at an average grating period a that corresponds to a line density 1/a between 700 and 1100 $mm^{-1}$, wherein an average height h and an average width w of the protrusions is such that h/a is between 0.84 and 0.96 and w/a is between 0.22 and 0.3.

10. The lamellar diffraction grating recited in claim 9 wherein the grating period corresponds to a line density 1/a between 800 and 1000 protrusions/mm.

11. A wavelength router for receiving, at an input port, light having a plurality of spectral bands and directing subsets of the spectral bands to respective ones of a plurality of output ports, the wavelength router comprising a free-space optical train disposed between the input port and the output ports providing optical paths for routing the spectral bands, the optical train including a reflective lamellar diffraction grating disposed to intercept light traveling from the input port, wherein the reflective lamellar diffraction grating has an arrangement of generally rectangular protrusions spaced along a substrate at an average grating period a, and an average height h and an average width w of the protrusions is such that h/a is between 0.84 and 0.96 and w/a is between 0.22 and 0.3.

12. The wavelength router recited in claim 11 wherein the grating period corresponds to a line density 1/a between 800 and 1000 protrusions/mm.

* * * * *